United States Patent [19]

Volmary et al.

[11] Patent Number: 5,295,465
[45] Date of Patent: Mar. 22, 1994

[54] APPARATUS AND METHOD FOR CONTROLLING IGNITION OF AN INTERNAL COMBUSTION ENGINE

[75] Inventors: William T. Volmary, Naperville, Ill.; Jeffrey S. Stueven, Howards Grove, Wis.

[73] Assignee: Kohler Company, Kohler, Wis.

[21] Appl. No.: 955,098

[22] Filed: Oct. 1, 1992

[51] Int. Cl.⁵ ............................................. F02P 5/155
[52] U.S. Cl. .................................... 123/418; 123/427; 123/602
[58] Field of Search ............... 123/149 C, 418, 427, 123/602

[56] References Cited

U.S. PATENT DOCUMENTS

| | | | |
|---|---|---|---|
| Re. 31,837 | 2/1985 | Burson | 123/601 |
| 3,484,677 | 12/1969 | Piteo | 322/91 |
| 4,020,807 | 5/1977 | Del Zotto et al. | 123/427 |
| 4,142,490 | 3/1979 | Hosaka et al. | 123/418 |
| 4,164,204 | 8/1979 | Guipaud | 123/415 |
| 4,202,305 | 3/1980 | Wolf | 123/599 |
| 4,215,284 | 7/1980 | Zentmeyer, Jr. | 310/70 A |
| 4,228,780 | 10/1980 | Kiess | 123/596 |
| 4,276,868 | 7/1981 | Burrows et al. | 123/602 |
| 4,285,321 | 8/1981 | Phelon et al. | 123/599 |
| 4,288,834 | 9/1981 | Burson | 361/256 |
| 4,297,977 | 11/1981 | Boyama | 123/320 |
| 4,333,442 | 6/1982 | Wolf | 123/599 |
| 4,336,785 | 6/1982 | Newberry | 123/605 |
| 4,380,989 | 4/1983 | Takaki | 123/644 |
| 4,403,593 | 9/1983 | Piteo | 123/651 |
| 4,406,271 | 9/1983 | Wolf | 123/599 |
| 4,407,256 | 10/1983 | Wolf | 123/599 |
| 4,448,179 | 5/1984 | Foster | 123/599 |
| 4,515,140 | 5/1985 | Enomoto et al. | 123/603 |
| 4,531,500 | 7/1985 | Burson | 123/630 |
| 4,568,903 | 2/1986 | Buckley | 336/197 |
| 4,587,942 | 5/1986 | Burson | 123/599 |
| 4,624,234 | 11/1986 | Koketsu et al. | 123/602 |
| 4,651,706 | 3/1987 | Yukawa | 123/651 |
| 4,712,521 | 12/1987 | Campen | 123/149 C |
| 4,746,890 | 5/1988 | Buckley et al. | 336/197 |
| 4,809,661 | 3/1989 | Kinoshita et al. | 123/418 |
| 4,924,831 | 5/1990 | Piteo et al. | 123/417 |
| 4,949,696 | 8/1990 | Muller et al. | 123/601 |

FOREIGN PATENT DOCUMENTS 59-18272 1/1984 Japan .

OTHER PUBLICATIONS

Translation of a paper by E. J. Hoetnik entitled "Project for Electronic Ignition Timing on Car Engines" published in the Dutch Review, de Ingenieur, vol. 76, No. 22, pp. W95–W99, May 19, 1964.

Primary Examiner—Tony M. Argenbright
Attorney, Agent, or Firm—Quarles & Brady

[57] ABSTRACT

An ignition system for an engine includes a position detector that generates a signal pulse while a segment of a member driven by the engine rotates past a given angular position. A first circuit produces a speed indicative voltage having a magnitude that is proportional to a duration of the signal pulse from the position detector. Upon termination of the signal pulse, a second circuit produces a second voltage the magnitude of which varies exponentially and an offset voltage is added to the second voltage at a node if the signal pulse is absent. A comparator has inputs coupled to the node and to the first circuit and produces an ignition signal when the voltage at the node and the speed indicative voltage are substantially equal.

10 Claims, 2 Drawing Sheets

ANALOG SPEED ADVANCE IGNITION
CAPACITOR C3 VOLTAGE VS. RPM

APPARATUS AND METHOD FOR CONTROLLING IGNITION OF AN INTERNAL COMBUSTION ENGINE

BACKGROUND OF THE INVENTION

The present invention relates to internal combustion engines; and more particularly to the ignition system for such engines.

In an internal combustion engine, the fuel in a cylinder is ignited by a spark plug at a prescribed point during the combustion cycle of the engine. For example, it is often desirable to ignite the fuel in advance of the moment at which the piston reaches the top dead center point in the cylinder.

Various types of ignition systems have been developed for four cycle gasoline engines. One type of ignition system employs a set of breaker points which act as a switch. A cam, that is mechanically coupled to the crank shaft of the engine, opens and closes the points at a given rotational angle, thereby controlling the flow of electricity to an ignition coil. When the points are opened, the magnetic field within the ignition coil collapses inducing a high voltage across a secondary winding of the coil. The secondary winding is connected to the spark plug and the high voltage causes a spark which ignites the fuel in the cylinder. The points, as well as the spark plug, wear over time and must be replaced occasionally.

The moment in the cycle at which the spark occurs must be regulated to insure maximum performance of the engine at different speeds. The initial burning of the fuel occurs during a relatively constant interval, which corresponds to an increased number of crankshaft degrees as the speed of the engine increases. As a consequence, a centrifugal mechanism often is used to advance the angle at which the cam opens the points as the engine speed increases. Typically, a weight is attached to either the cam or the breaker points so that as the engine speed increases the movement of the weight under centrifugal force effectively advances the angular position of the cam relative to the crankshaft. In this new position, the points open at an earlier time than before, which advances the spark within the engine cycle.

U.S. Pat. No. 3,484,677 discloses a breakerless ignition system having an energizing coil in which electrical energy is induced by a rotating permanent magnet to provide power for creating an ignition spark. The fixed timing of the ignition is controlled by an electronic circuit which includes an electronic switch and a control coil. Electric current induced in the control coil by the rotating permanent magnet closes the switch causing the induced current to flow through the energizing coil and producing a spark that ignites the fuel in the cylinder.

Although this latter type of ignition system overcomes some of the problems associated with breaker points, it does not provide a mechanism by which the spark can be advanced or retarded with engine speed.

SUMMARY OF THE INVENTION

An apparatus for controlling the ignition advance of an internal combustion engine produces a signal when a segment of a member, driven by the engine, passes adjacent a sensor. A threshold circuit receives the sensor signal and responds by producing a pulse while the signal exceeds a defined magnitude. A source, controlled by the threshold circuit, applies a constant current to a node when the pulse is being produced and a first capacitor is connected to the node so that a voltage across the first capacitor is proportional to a duration of the signal pulse.

An RC circuit, with a second capacitor, is connected to a voltage supply so that a voltage across the second capacitor varies exponentially according to a defined time constant A first switch is coupled to and operated by the threshold circuit to discharge the second capacitor during the pulse. A source of an offset voltage is connected to the RC circuit so that the offset voltage and the voltage across the second capacitor are summed into a combined voltage.

A comparator has a first input to which the combined voltage is applied and a second input connected to receive the voltage produced across said first capacitor. The comparator produces an ignition signal when voltages at the inputs are substantially equal. A second switch is coupled to and operated by the threshold circuit to clamp the first input of the comparator to ground during the signal pulse. A third switch coupled to discharge the first capacitor in response to the ignition signal.

An object of the present invention is to provide a breakerless engine ignition system that includes a mechanism for advancing the time of ignition as the engine speed increases.

DESCRIPTION OF THE PRESENT INVENTION

Figure 1:
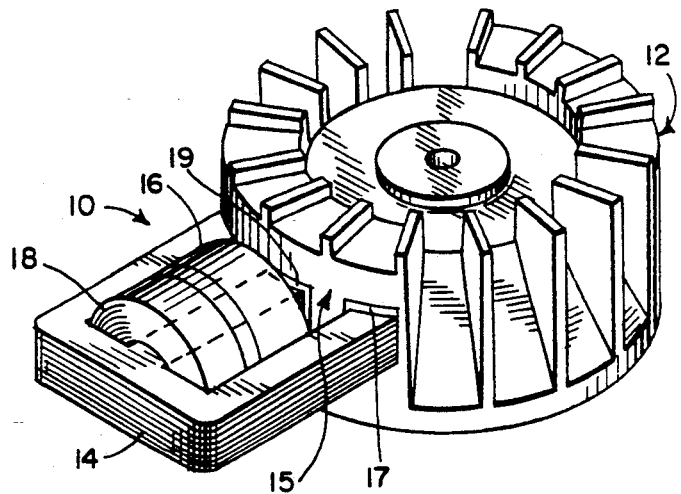
FIG. 1 is a perspective view of a capacitor discharge ignition system of the present invention located adjacent a flywheel of an engine.

With initial reference to FIG. 1, a capacitor discharge ignition system 10 is shown in operative position adjacent a flywheel 12 of an engine. The flywheel 12 carries a permanent magnet referred to generally at 15 that energizes and controls the basic timing of the ignition system upon rotation of the flywheel 12. The permanent magnet 15 includes two magnetic pole pieces 17 and 19. The ignition system 10 includes a generally E-shaped stator core 14 on the center leg of which are disposed a charging coil 16 and an ignition coil 18.

Figure 2:
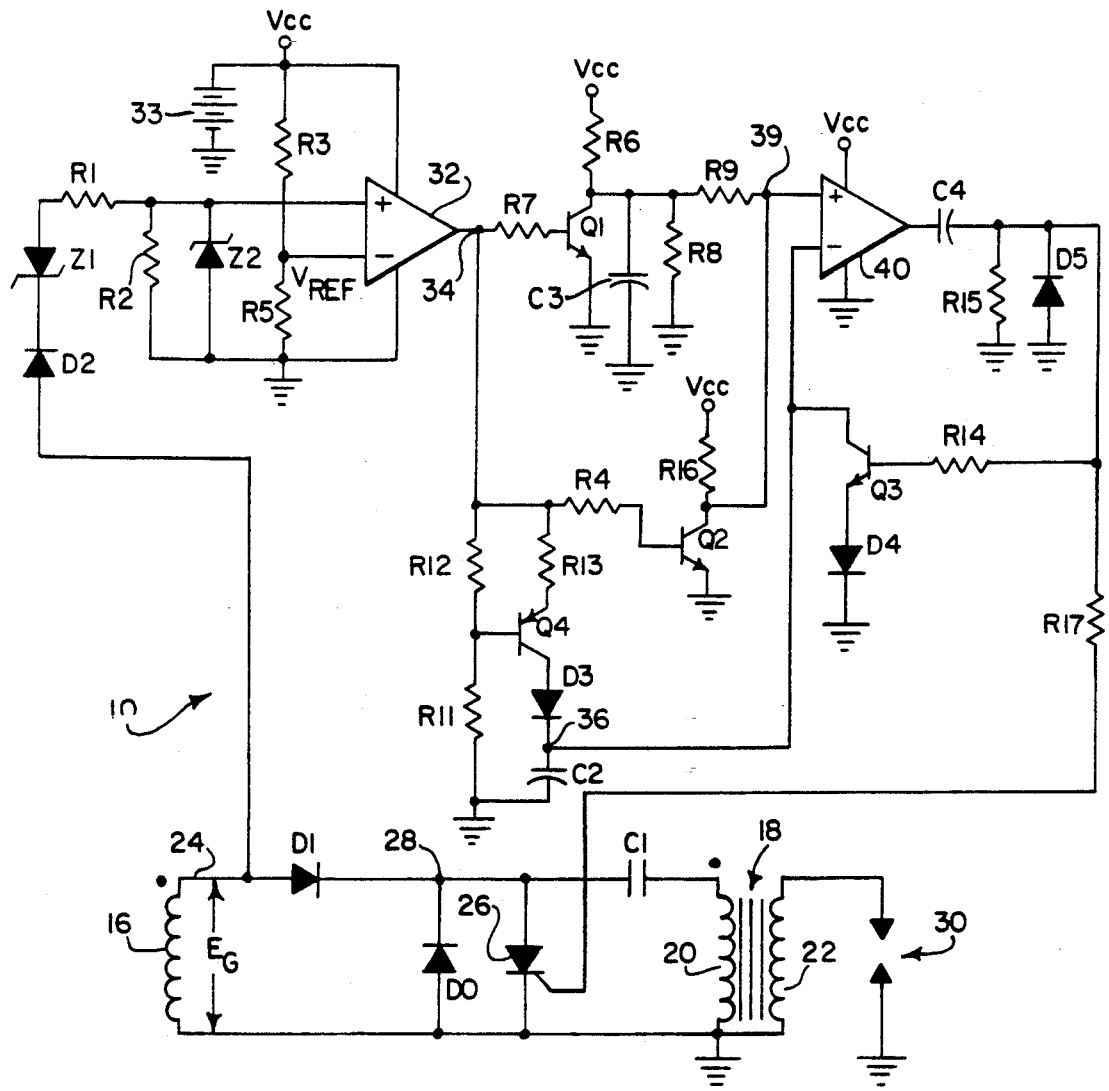
FIG. 2 is a schematic diagram of the electronic circuit for the ignition system.

Referring to FIG. 2, the ignition coil 18 includes a primary winding 20 and a secondary winding 22 concentrically arranged adjacent to one another on the stator core 14. One end of each of the charging coil 16 and the primary and secondary windings 20 and 22 are connected to circuit ground. The other end 24 of the charging coil 16 is connected by a diode D1 and a capacitor C1 to the other end of the primary winding 20. The conduction path of an SCR 26 and parallel diode D0 couple a node 28, that is between the diode D1 and capacitor C1, to circuit ground. The other end of the secondary winding 22 of the ignition coil 18 is connected to a spark plug 30.

Figure 3:
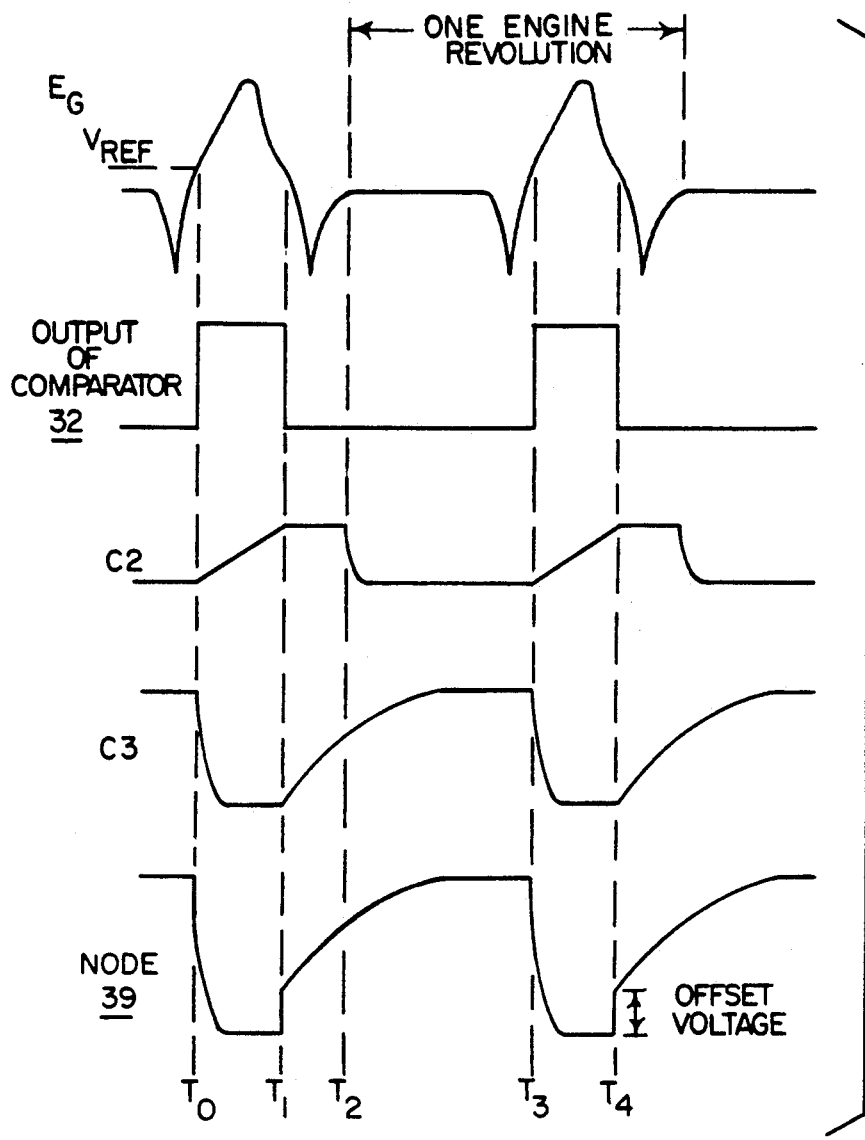
FIG. 3 is a set of voltage waveforms at several points of the electronic circuit.

When the permanent magnet 15 on the flywheel 12 passes the stator core 14, an electric current is induced in the charging coil 16. The top waveform in FIG. 3 depicts the voltage $E_G$ induced across the charging coil 16. As the permanent magnet 15 approaches the charging coil prior to time $T_0$, the voltage goes negative and then increases to zero at time $T_0$. After time $T_0$, the voltage increases to a peak and then decreases to zero at shortly after time $T_1$. Thereafter, a negative spike occurs in the charging coil voltage $E_G$. The voltage $E_G$ is rectified by diode D1 to charge capacitor C1. The diode D1 also blocks the negative pulse in voltage $E_G$ from draining the capacitor charge. Capacitor C1 stores energy which later will be discharged through the primary winding 20 of the ignition coil 18 when the SCR 26 is rendered conductive. This discharge of the energy in capacitor C1 produces a spark in the spark plug 30.

The SCR 26 is triggered into a conductive state by a signal produced by the control circuit in the upper portion of FIG. 2. The current pulse that is induced in the charging coil 16 also is rectified by diode D2 which passes only the positive current from that coil. When the voltage across Zener diode Z1 exceeds the breakdown level, current is applied from the charging coil 16 through resistor R1 to the non-inverting input of a voltage comparator 32. Zener diode Z1 blocks any spurious current produced by fringing effects as the permanent magnet 15 approaches the stator core 14. Resistor R2 in conjunction with resistor R1 form a first voltage divider which reduces the voltage passed by Zener diode Z1 to an acceptable level for comparator 32. A second Zener diode Z2 prevents the voltage on a non-inverting input of comparator 32 from exceeding a level which may damage the comparator. A second voltage divider formed by resistors R3 and R5 is coupled between ground and a positive voltage Vcc from a battery 33. The second voltage divider produces a reference voltage $V_{REF}$ that is applied to the inverting input of comparator 32. When the output from the charging coil 16 exceeds the reference voltage at times $T_0$ and $T_3$, a positive voltage is produced at node 34 by the comparator, as shown in the second waveform in FIG. 3. The comparator 32 produces a square-shaped pulse of constant magnitude from the rounded positive pulse generated by charging coil 16.

Node 34 is connected to one end of a third voltage divider formed by resistors R11 and R12 having another end connected to circuit ground. Node 34 is also connected by resistor R13 to the emitter of a transistor Q4 having its base connected to an intermediate point of the third voltage divider between resistors R11 and R12. Diode D3 connects the collector of transistor Q4 to node 36. The combination of resistors R11, R12 and R13, transistor Q4 and diode D3 form a constant current source that applies a constant current to node 36 while node 34 is at a positive voltage with respect to circuit ground. This constant current charges a capacitor C2 which is connected between node 36 and circuit ground. The third waveform in FIG. 3 illustrates the voltage across capacitor C2. During the interval $T_0$-$T_1$, while the comparator 32 produces a positive output voltage, the capacitor C2 charges at a constant rate. At time $T_1$, the comparator's output goes to ground and capacitor C2 stops charging. The voltage across capacitor C2 at time $T_1$ is held relatively constant until time $T_2$.

The duration of the positive voltage pulse induced across coil 16 is inversely related to the speed at which the permanent magnet 15 passes the ignition system 10, and hence is a function of the speed of the engine which drives the flywheel 12. Correspondingly, the duration of the interval $T_0$-$T_1$, during which constant current is applied to capacitor C3, also is a function of the engine speed. At the end of that pulse, the voltage across the capacitor C2 is inversely proportional to the speed of the engine. This voltage is connected directly to the inverting input of a second comparator 40.

Figure 4:
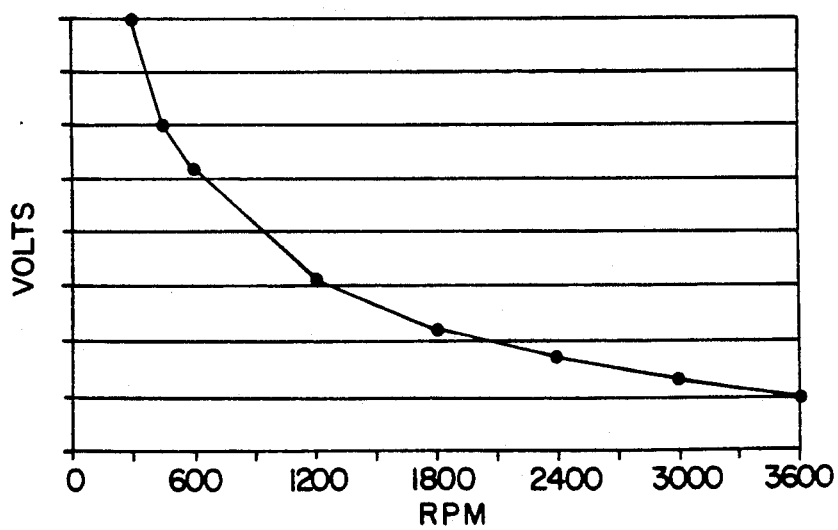
FIG. 4 is a graph of the relationship between the charge on a capacitor in the electronic circuit and engine speed.

Node 34 at the output of the first comparator 32 is connected by resistor R7 to the base of transistor Q1. The emitter of transistor Q1 is connected to circuit ground and the collector is coupled by resistor R6 to the positive voltage Vcc. The collector of Q1 also is coupled to ground by capacitor C3 and resistor R8. During the portion ($T_0$-$T_1$) of the current pulse induced in the charging coil 16 when the first comparator 32 is producing a positive output, transistor Q1 is conductive. The conductive path provided by transistor Q1 discharges any voltage across capacitor C3 as shown in the fourth waveform of FIG. 3. When the output of the first comparator 32 again goes low at time $T_1$, transistor Q1 turns off. With transistor Q1 non-conductive, capacitor C3 charges exponentially as a function of the time constant set by the value of capacitor C3 and the values of resistors R6 and R8. This exponential waveform defines an engine ignition advance function, which is the inverted function shown in FIG. 4 that illustrates the relationship of capacitor voltage to engine speed. The exponentially rising voltage across capacitor C3 is applied by resistor R9 to a node 39 at the non-inverting input of the second voltage comparator 40.

The non-inverting input of the second comparator 40 is biased with an offset voltage supplied by resistor R16 which connects node 39 to the positive voltage Vcc. Transistor Q2 has its collector-emitter path connected between the non-inverting input of the second comparator 40 and circuit ground. The base of transistor Q2 is connected by resistor R4 to node 34 at the output of the first comparator 32. During the current pulse induced in the charging coil 16 when the first comparator 32 produces a positive output, transistor Q2 will be conductive thereby removing the offset voltage by clamping the non-inverting input of the second comparator 40 to ground, as shown in the bottom waveform in FIG. 3. This inhibits the second comparator 40 from producing a positive output while capacitor C2 is charging.

At time $T_1$, the voltage level held across capacitor C2 is inversely proportional to the speed of the engine. Thus, the voltage applied to the inverting input of the second comparator 40 represents the speed of the engine. At the same time ($T_1$), when the output of the first comparator 32 goes low, transistors Q1 and Q2 turn off applying the offset voltage to the non-inverting input of the second comparator 40. When the engine is running at maximum speed, the offset voltage exceeds the voltage across capacitor C2 which represents engine speed. As a result, at maximum, speed, the second comparator 40 will immediately produce a positive output pulse which is applied by capacitor C4 and R17 to the gate of SCR 26, thereby firing the spark plug 30. Resistor R15 connected to the plate of capacitor C4 that is remote from the second comparator 40 defines a time constant for the pulse that triggers the SCR 26. A normally reverse biased diode is also connected between this plate of capacitor C4 and ground.

At lower engine speeds, when the transistors Q1 and Q2 turn off at time $T_1$, the voltage across capacitor C2 applied to the inverting input of the second comparator 40 is greater than the offset voltage applied to the non-inverting input. Thus, at these speeds, the second comparator 40 initially continues to produce a low level output which does not cause firing of the spark plug 30. However, when transistor Q1 turns off, the voltage across capacitor C3 begins to rise exponentially and eventually the summation of this voltage with the offset voltage at node 39 exceeds the now constant voltage across capacitor C2. When this occurs at time $T_2$, the non-inverting input of the second comparator 40 will be at a higher voltage than the inverting input causing the second comparator to produce a positive output voltage which triggers the SCR 26 firing the spark plug 30. Thus the spark plug fires when the piston is closer to top dead center at slower speeds. The exponential rise in voltage with time defines the relationship between ignition firing advance and the speed of the engine.

The SCR trigger pulse produced by the RC circuit connected to the output of the second comparator 40 also is coupled by resistor R14 to the base of transistor Q3 rendering that transistor conductive. The collector of transistor Q3 is connected to node 36 at one side of capacitor C2. The emitter of transistor Q3 is connected by diode D4 to ground. When transistor Q3 is pulsed into a conductive state by the SCR trigger pulse at time $T_2$, it becomes conductive discharging capacitor C2 for the next ignition cycle. The ignition process repeats when the flywheel 12 is rotated again into a position where the permanent magnet 15 passes the stator core 14 of the ignition system.

The present ignition system 10 has a first circuit, that includes capacitor C2, which produces a first voltage that is indicative of engine speed. A second circuit, that includes capacitor C3, produces a second voltage which varies exponentially with time and which defines an ignition advance function that relates engine speed with the crankshaft angle at which the spark plug 30 is fired. An offset voltage is added to the second voltage at node 39 to produce a combined voltage. The ignition signal that triggers the SCR 26 to fire the spark plug 30 is produces when the combined voltage substantially equals or exceeds the first voltage. The offset voltage insures that the spark plug will be fired immediately at the end of the positive pulse from the charging coil 16 when the engine is running at maximum speed. By removing application of the offset voltage during that positive pulse, the spark plug will not be fired during the pulse while the first voltage is below the offset voltage.

The invention being claimed is:

1. An ignition system for an engine which rotates a member comprising:
    a spark discharge device;
    a position detector which generates a signal pulse while a segment of the member passes nearby;
    a first circuit, connected to said position detector, for producing a first voltage having a magnitude proportional to a duration of the signal pulse;
    a second circuit connected to said position detector and upon termination of the pulse produces a second voltage having a magnitude which varies exponentially with time;
    a third circuit, connected to said position detector, for producing an offset voltage only during the absence of the signal pulse;
    a node at which the second voltage and the offset voltage are summed to provide combined voltage;
    a comparator having inputs coupled to said node and to said first circuit and which produces an ignition signal when the combined voltage is at least equal to the first voltage; and
    a supply coupled to said comparator and which applies a voltage to said spark discharge device to generate a spark in response to the ignition signal.

2. The ignition system as recited in claim 1 wherein said first circuit comprises a constant current source connected to a capacitor and which charges the capacitor while said position detector is generating the signal pulse.

3. The ignition system as recited in claim 1 wherein said a third circuit includes means for clamping said node to ground potential when said position detector is generating a signal pulse.

4. The ignition system as recited in claim 1 wherein said position detector comprises:
    a magnet attached to the member;
    a coil across which a voltage is generated when said magnet passes nearby; and
    another comparator which is connected to said coil and which produces the signal pulse when the voltage generated across said coil exceeds a defined magnitude.

5. An apparatus for controlling the ignition advance of an internal combustion engine which rotates a member, said apparatus comprising:
    a sensor which produces a signal when a segment of the member passes adjacent thereto;
    a threshold circuit connected to said sensor and which produces a signal pulse at an output terminal while the signal exceeds a defined magnitude;
    a source controlled by the threshold circuit to apply a constant current to a first node when the signal pulse is being produced;
    a first capacitor connected to the first node so that a voltage across said first capacitor is proportional to a duration of the signal pulse;
    an RC circuit with a second capacitor and connected to a voltage supply to produce a voltage across the second capacitor which varies according to a defined time constant;
    a first switch coupled to and operated by said threshold circuit to discharge the second capacitor during the signal pulse;
    a second node coupled to said RC circuit so that a voltage at said second node corresponds to the voltage across the second capacitor;
    a source of an offset voltage which is coupled to said second node;
    a second switch coupled to and operated by said threshold circuit to clamp said second node to ground during the signal pulse;
    a first comparator having a first input connected to said second node and a second input connected to receive the voltage produced across said first capacitor, and producing an ignition signal when a voltage at the first input is at least equal to a voltage at the second input; and
    a third switch coupled to discharge said first capacitor in response to the ignition signal.

6. The ignition system as recited in claim 5 wherein said threshold circuit comprises a Zener diode.

7. The ignition system as recited in claim 6 wherein:
    said sensor comprises a magnet attached to the member, and a coil across which a voltage is generated when the magnet passes nearby; and
    said threshold circuit comprises a second comparator connected to the coil to produce the signal.

8. The ignition system as recited in claim 7 wherein said threshold circuit further comprises a voltage divider connecting the second comparator to the coil.

9. The ignition system as recited in claim 7 wherein said threshold circuit further comprises a Zener diode connecting the second comparator to the coil.

10. The ignition system as recited in claim 5 further comprising a means, connected to said first comparator, for producing an ignition trigger pulse in response to the ignition signal.

* * * * *